United States Patent [19]
Miller

[11] Patent Number: 5,501,247
[45] Date of Patent: Mar. 26, 1996

[54] PRESSURE REGULATOR WITH MEANS TO BLOCK RELATIVE ROTATION OF PARTS DURING ASSEMBLY

[75] Inventor: Robert F. Miller, Arcadia, Calif.

[73] Assignee: Vemco Corporation, San Dimas, Calif.

[21] Appl. No.: 390,671

[22] Filed: Feb. 17, 1995

[51] Int. Cl.⁶ ................................................ G05D 16/06
[52] U.S. Cl. ...................... 137/316; 137/505; 137/505.41
[58] Field of Search .................................. 137/315, 316, 137/505, 505.41, 505, 42

[56]  References Cited

U.S. PATENT DOCUMENTS

| | | | |
|---|---|---|---|
| 368,650 | 8/1887 | Carpenter . | |
| 1,513,423 | 10/1924 | Raymond . | |
| 2,662,348 | 12/1953 | Jacobsson | 137/505.41 X |
| 2,693,932 | 11/1954 | Richards . | |
| 2,895,640 | 7/1959 | Becker et al. | 137/505.42 X |
| 3,376,887 | 4/1968 | Boteler . | |
| 3,621,867 | 11/1971 | Johnson | 137/505.42 X |
| 3,754,570 | 8/1973 | Hughes | 137/505 X |
| 4,266,566 | 5/1981 | Kacal et al. | 137/316 |
| 4,922,950 | 5/1990 | Taylor | 137/316 |
| 5,060,987 | 10/1991 | Miller | 285/328 |
| 5,141,022 | 8/1992 | Black | 137/505.41 X |
| 5,186,209 | 2/1993 | McManigal et al. | 137/505.18 |

*Primary Examiner*—Stephen M. Hepperle
*Attorney, Agent, or Firm*—William W. Haefliger

[57]  ABSTRACT

In a fluid pressure regulator, the combination comprising a body forming a cavity and a cap on the body extending over the cavity, the cap and body carrying interengaging threads allowing rotary make-up of the cap on the body; a diaphragm in the cavity and seated on a ledge formed by the body, thereby to form a seal; a pressure transmitting element in the cavity to transmit cap pressure to said seal; the body having flow porting and there being a poppet in the body and movable to control fluid flow via the porting; a spring in the cap and structure in the cavity and axially movable to transmit spring pressure to the diaphragm, the poppet carried for axial movement with the structure, and blocking means to block relative rotary movement between the pressure transmitting element and at least one of the body and the structure.

21 Claims, 2 Drawing Sheets

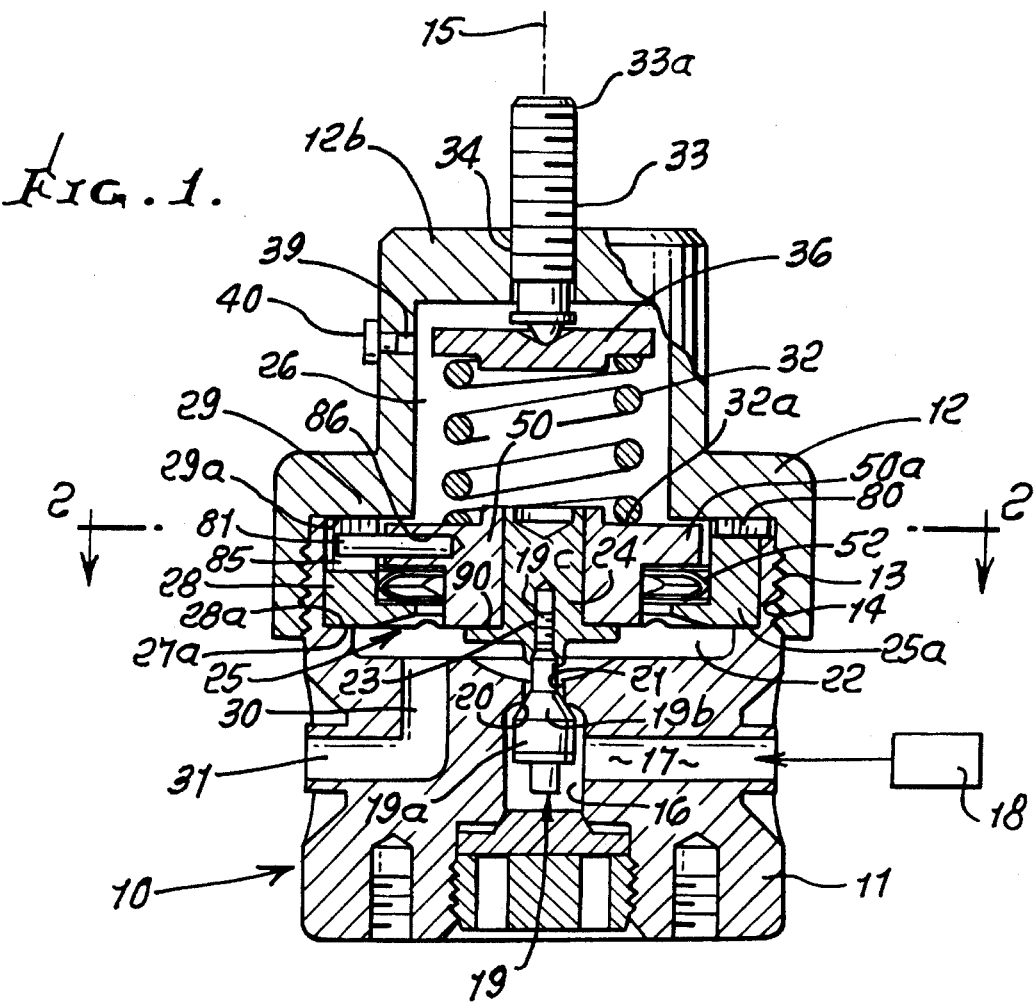

PRESSURE REGULATOR WITH MEANS TO BLOCK RELATIVE ROTATION OF PARTS DURING ASSEMBLY

BACKGROUND OF THE INVENTION

This invention relates generally to the assembly of pressure regulator parts, and more specifically in regulator apparatus in which seals are made or formed in response to such assembly.

When fluid pressure regulator parts are assembled, and a cap is screwed onto a body, a pressure seal or seals are directly made up or formed between regulator parts being assembled. Such seals are desirably made up by axial force only, i.e. free of relative rotation of interengaged surfaces at the seals, since such relative rotation can and does cause surface distortions which can lead to seal failure, fluid leakage, and/or undesirable particle generation. There is need for simple, effective, reliable means to prevent such sealing surface distortions in devices of this type.

In one example, the problem arises during the assembly of a pressure regulator in which a first seal is made between a pressure controlling diaphragm and a valve body. The first seal is made by having threads in the body which engage mating threads in cap engagement. When the cap is turned clockwise, it exerts an axial force on a thrust sleeve which transmits this force to a diaphragm and forces the diaphragm against the body at the seal. The problem arises because the cap also exerts a rotational force on the thrust sleeve which transmits this rotational force to the diaphragm. This rotational force may cause the diaphragm to rotate relative to the body. The combination of axial force and rotation of the diaphragm against the body can damage the effectiveness of the seal and may also create unwanted particles. In high-purity regulators, minimization of particles is exceedingly important.

In another example the problem arises when a poppet is screwed into a poppet holder, which is done after the seal has been made as described above. Tightening the poppet puts torque on the poppet holder as well as on a spring support. Since these parts clamp the diaphragm firmly to form a second seal, this torque is transmitted to the diaphragm, which can cause the second seal to rotate relative to the first seal. This relative rotation of the inner and outer portions of the diaphragm can cause wrinkling and other unwanted distortions of the diaphragm.

It is extremely important that the unwanted rotations described above be eliminated, and it is the purpose of this invention to accomplish this.

SUMMARY OF THE INVENTION

It is a major object of the invention to provide a solution to the above problem. Basically, the invention is embodied in a regulator combination that comprises a) a body forming a cavity and a cap on the body extending over the cavity, the cap and body carrying interengaging threads allowing rotary make-up of the cap on the body, b) a diaphragm in the cavity and seated on a ledge formed by the body, thereby to form a seal, c) a pressure transmitting element in the cavity to transmit cap pressure to the seal, d) the body having flow porting and there being a poppet in the body and movable to control fluid flow via the porting, e) a spring in the cap, f) structure in the cavity and axially movable to transmit spring pressure to the diaphragm, g) the poppet carried for axial movement with the structure, the poppet and the structure carrying interengaged threads allowing rotary axial assembly of the poppet to the structure.

Within this environment, the invention comprises blocking means to block relative rotary movement between the pressure transmitting element and at least one of the body and the structure. In one form of the invention, the blocking means includes at least a first key extending generally radially between the pressure transmitting element and at least one of the body and the structure; and in another form of the invention the blocking means comprises interengaged flats.

A further object is the provision of a blocking means in the form of a first key extending generally radially between the pressure transmitting element and the body. Typically, radially extending slots are formed in the pressure transmitting element of the body, and such slots are preferably formed at the ends of such parts.

Yet another object is the provision of a blocking means in the form of a second key extending generally radially between the pressure transmitting element and the axially movable structure. Typically, radially extending slots are formed in the spring pressure transmitting element and in the pressure transmitting structure, and in such manner as to accommodate relative axial motion as between said structure and element, during regulator operation.

These and other objects and advantages of the invention, as well as the details of an illustrative embodiment, will be more fully understood from the following specification and drawings, in which:

DRAWING DESCRIPTION

FIG. 1 is a vertical section taken through a regulator embodying the invention;

FIG. 2 is a section taken on lines 2—2 of FIG. 1;

DETAILED DESCRIPTION

Figure 3:
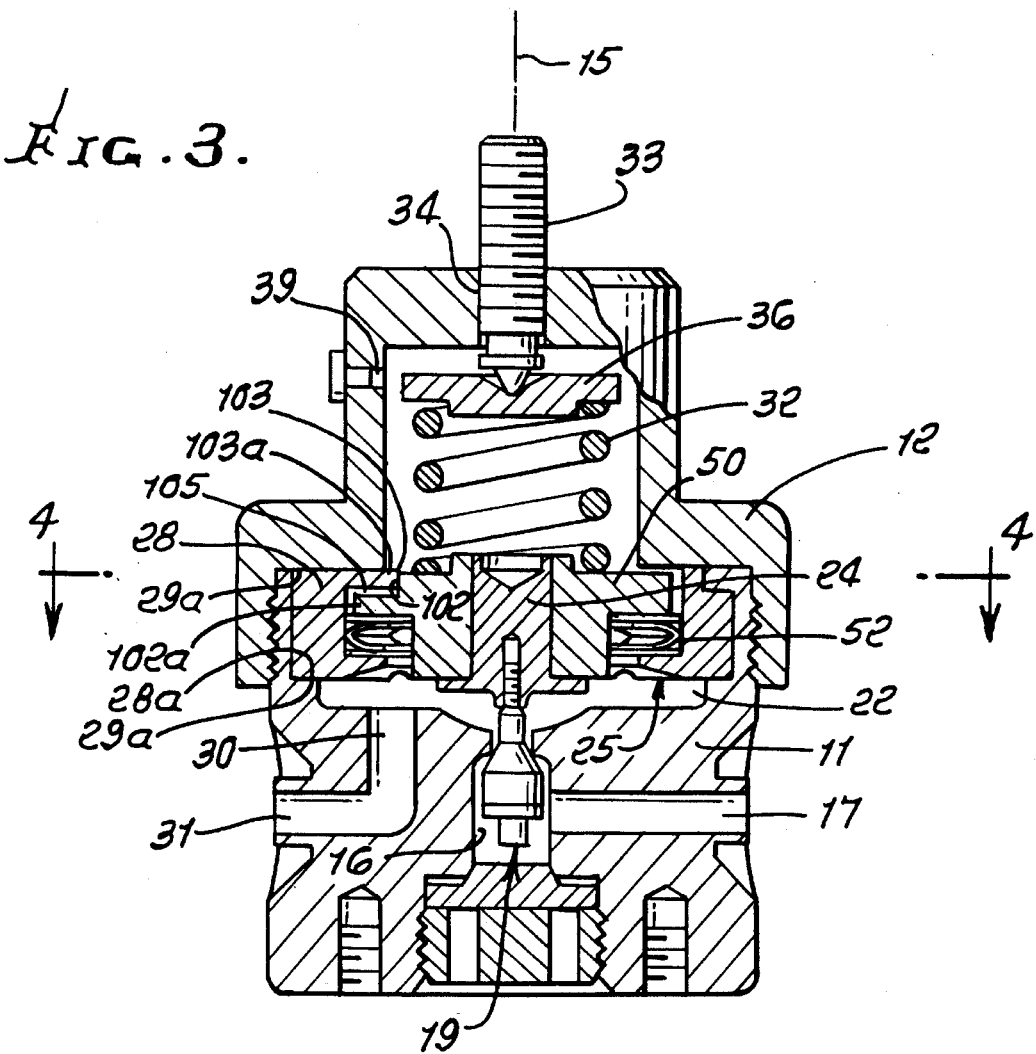
FIG. 3 is a view like FIG. 1, showing another form of the invention.

In FIG. 1, a housing 10 includes a body 11 and a cap 12 connected to the body. As shown, an external pin thread 13 on the body is connected to the cap internal box thread 14. A body and cap common axis is indicated at 15.

The body forms a central vertical passage 16, and a side inlet port 17 communicating with passage 16. A source 18 of inlet fluid, as for example high pressure gas, communicates with inlet port 17. A poppet or stopper 19 is positioned in passage 16 to move vertically or axially therein, relative to an annular seat 20, for controlling fluid flow through an orifice 21 bounded by the seat. Passage 16 is located at the upstream side of the seat, and the poppet is shown as having a cylindrical section 19a in passage 16, a tapered section 19b extending upwardly into the orifice, toward chamber 22 at the downstream side of the seat. A section 19c of the poppet has threaded connection at 23 with poppet holder 24 carried by a main diaphragm 25.

Diaphragm 25 extends transversely between lower chamber 22 and an upper chamber 26 within the cap 12. Its annular outer portion 25a is retained between annular shoulder 27a on the body 11, and downwardly facing surface 28a of thrust sleeve 28. Surface 28a is flat, whereas shoulder 27a is upwardly projected. Thus, sleeve 28 transmits cap force, via shoulders 29 and 29a, to the annular seal formed at 27a and 28a. Diaphragm 25 is responsive to gas pressure at the downstream side of the orifice 21 and operatively connected with the poppet 19 to control poppet movement toward or away from the orifice 21 in response to an increase or decrease in pressure at the downstream side of the orifice, respectively.

The body 11 also forms outlet porting 30 and 31 communicating between chamber 22, and the exterior, whereby fluid such as gas that passes through the orifice 21 into chamber 22 exits the latter at regulated pressure via 30 and 31. The level of regulated pressure at outlet 31 may be controlled as by range spring 32 operatively connected with the main diaphragm 25 to yieldably urge the main diaphragm 25 toward the orifice 21. Range spring 32 may be a coil spring, as shown, and adjustment means is operatively connected with the range spring 32 to adjust the tension thereof. Such adjustment means may include an adjusting screw 33 thread connected at 34 to the cap top wall 12b, and extending between a support plate 36 for the top end of the range spring 32, and screw upper extent 33a which is rotatably adjustable. If the screw is rotated in one direction, the regulated pressure is increased, and if rotated in the opposite direction, the regulated pressure is decreased. Upper chamber 26 may be vented to the exterior, as at 39 for example, by removal of a plug 40.

Associated with the diaphragm 25 is an annular support structure 50 for the range spring 32. Note the bottom end 32 of the spring seated on the support 50, at 32a. Support extends about poppet holder 24 and is attached thereto, to move axially with the poppet, whereby spring force is transmitted via 50 and 24 to the poppet. Also, spring pressure or force is transmitted to the diaphragm 25, via flange 50a on 50, and single turn of a helical wave spring 52, extending about 50, as shown, the spring 52 providing a means for ensuring the closure at seat 20 by poppet 19 when range spring 32 exerts no force on structure 50 and the pressure in chamber 22 is atmospheric.

In accordance with important aspects of the invention, blocking means is provided to block relative rotary movement between the pressure transmitting element and at least one of the body and said structure. Such blocking means typically includes at least a first key extending generally radially between said pressure transmitting element and said at least one of the body and said structure.

See for example the key 80 that extends generally radially between the pressure transmitting thrust sleeve element 28 and the body 11 to block relative rotation therebetween, and the key 81 that extends generally radially between the element 28 and the support structure 50, to block relative rotation therebetween.

The key 80 extends in radial slots 83 and 84 of the same width cut in the tops of 28 and 11, and in such manner that cap 12 does not exert any axial force on the key 80 when the cap is screwed down on body 11. Key 80 has substantially the same width in such slots. Thus, whereas key 80 prevents relative rotation between 28 and 11 during assembly of the parts, full axial force can be exerted in an angular, uniform manner by cap 12 onto diaphragm 25, to form or produce an annular seal at engaged surfaces 27a and 28a.

The key 81 extends in radial slots 85 and 86 of the same width cut in 28 and 50, key 81 having substantially the same width as such slots. Slot 86 is formed as a radial blind hole into structure 50, to accommodate radial insertion of the key 81. Slot 85 is sunk downwardly into element 28 from its top surface, and to a depth such that the key 81 is prevented from engaging the bottom of the slot when the cap 12 is screwed downwardly onto the body 11. Key 81 is also short enough that is does not engage body 11 when the assembly that consists of elements 24, 25, and 28 is inserted downwardly into cavity 22, before cap 11 is screwed into place. Thus, key 81 prevents any angular relative rotation between 50 and 28 during assembly, without interfering with the relative axial motion between 50 and 28 which is necessary for the operation of the regulator.

In this way, relative rotation of parts 50 and 24, and at the seal location 90, is also prevented. Note that the keys 80 and 81 are at opposite sides of the axis 15, as seen in FIG. 2; and note also that the keys 80 and 81 typically extend in radial planes normal to axis 15 and that are axially offset.

Figure 4:
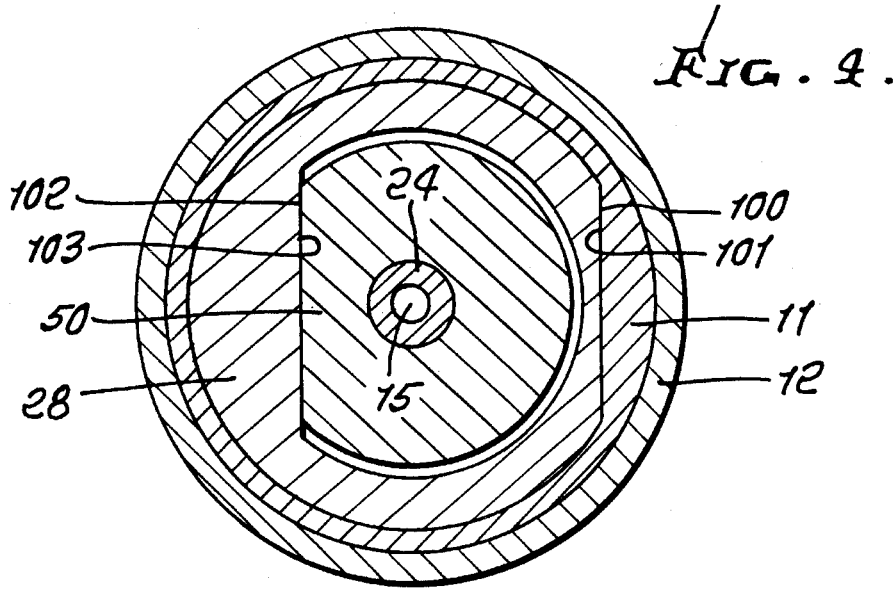
FIG. 4 is a section taken on lines 4—4 of FIG. 3.

FIGS. 3 and 4 show a modification, in which elements the same as shown in FIGS. 1 and 2 bear the same identifying numbers.

In FIGS. 3 and 4, the blocking means takes the form of first interengaged flats 100 and 101 on 28 and 11, and second interengaged flats 102 and 103 on 50 and 28. All such flats interact the upper end surfaces of 28 and 11, and of 50 and 28, as is seen in FIG. 3. Also flats 100 and 101 are at one side of axis 15, and flats 102 and 103 are at the opposite side of that axis, and all flats extend in parallel relation. Support 50 is allowed to move axially relative to 28, by virtue of the provision of space 105 formed between flange 103a on 28 that forms flat 103 and flange 102a on 50.

I claim:

1. In a fluid pressure regulator, the combination comprising:
   a) a body forming a cavity and a cap on the body extending over the cavity, the cap and body carrying interengaging threads allowing rotary make-up of the cap on the body,
   b) a diaphragm in the cavity and seated on a ledge formed by the body, thereby to form a seal,
   c) a pressure transmitting element in the cavity to transmit cap pressure to said seal,
   d) the body having flow porting and there being a poppet in the body and movable to control fluid flow via said porting,
   e) a spring in the cap,
   f) structure in the cavity and axially movable to transmit spring pressure to the diaphragm,
   g) the poppet carried for axial movement with said structure,
   h) and blocking means to block relative rotary movement between the pressure transmitting element and at least one of the body and said structure, said blocking means extending generally radially relative to said pressure transmitting element and said one of the body and said structure.

2. In a fluid pressure regulator, the combination comprising:
   a) a body forming a cavity and a cap on the body extending over the cavity, the cap and body carrying interengaging threads allowing rotary make-up of the cap on the body,
   b) a diaphragm in the cavity and seated on a ledge formed by the body, thereby to form a seal,
   c) a pressure transmitting element in the cavity to transmit cap pressure to said seal,
   d) the body having flow porting and there being a poppet in the body and movable to control fluid flow via said porting, e) a spring in the cap, f) structure in the cavity and axially movable to transmit spring pressure to the diaphragm, g) the poppet carried for axial movement with said structure, h) and blocking means to block relative rotary movement between the pressure transmitting element and at least one of the body and said structure, i) and wherein said blocking means includes at least a first key extending generally radially between said pressure transmitting element and said at least one of the body and said structure.

3. The combination of claim 2 wherein said blocking means includes shoulders on said pressure transmitting means and on at least one of the body and said structure, said shoulders engagable by said blocking means in response to cap rotation relative to the body, while allowing relative axial movement between said pressure transmitting means and said one of the body and said structure.

4. The combination of claim 2 wherein said first key extends generally radially between said pressure transmitting element and said body.

5. The combination of claim 2 wherein said key extends generally radially between said pressure transmitting element and said structure.

6. The combination of claim 2 wherein there is a second key, one of said keys extending generally radially between said pressure transmitting element and said body, and the other of said keys extending generally radially between said pressure transmitting element and said structure.

7. The combination of claim 6 wherein said blocking means includes certain shoulders on said pressure transmitting element and on the body to be engagable by said one key in response to cap rotation while allowing relative axial movement between the pressure transmitting element on the body, and other shoulders on the pressure transmitting element and on said structure to be engagable by the cap in response to cap rotation while allowing relative axial movement between the pressure transmitting element and said structure.

8. The combination of claim 1 wherein there is an orifice in the body controlled by the poppet in response to poppet said movement, the orifice having upstream and downstream sides, and being in fluid flow communication with said porting, the diaphragm having operative connection with the poppet to control poppet movement toward and away from the orifice in response to fluid pressure changes at the downstream side of the orifice, said blocking means spaced from said orifice.

9. The combination of claim 8 wherein said body and cap enclose said poppet, orifice, diaphragm, cap pressure transmitting element and said spring pressure transmitting structure.

10. The combination of claim 8 wherein said porting includes a fluid pressure inlet in the body and communicating with the upstream side of the orifice, and a fluid pressure outlet communicating with the downstream side of the orifice.

11. The combination of claim 2 including radially excluding slots formed in said pressure transmitting element and said at least one of the body and said structure, to receive said first key.

12. The combination of claim 6 including first radially extending slots formed in said pressure transmitting element and said body to receive said one key, and second radially extending slots formed in said pressure transmitting element and said structure to receive said other key.

13. The combination of claim 12 wherein said body has a main axis, and said keys are at opposite side of said axis.

14. The combination of claim 13 wherein said keys extend in radial planes that are axially offset.

15. The combination of claim 14 wherein said first radial slots are formed at the axial ends of said pressure transmitting element and said body.

16. The combination of claim 14 wherein said second radial slots are formed as a blind radial slot in said structure, and as an axially deep slot in said pressure transmitting element, whereby relative axial motion of said structure and of said pressure transmitting element during regulator operation does not cause said second key to axially engage the bottom of the deep slot.

17. The combination of claim 15 wherein said second radial slots are formed as a blind radial slot in said structure, and as an axially deep slot in said pressure transmitting element, whereby relative axial motion of said structure and of said pressure transmitting element during regulator operation does not cause said second key to axially engage the bottom of the deep slot.

18. In a fluid pressure regulator, the combination comprising:

a) a body forming a cavity and a cap on the body extending over the cavity, the cap and body carrying interengaging threads allowing rotary make-up of the cap on the body, b) a diaphragm in the cavity and seated on a ledge formed by the body, thereby to form a seal, c) a pressure transmitting element in the cavity to transmit cap pressure to said seal, d) the body having flow porting and there being a poppet in the body and movable to control fluid flow via said porting, e) a spring in the cap, f) structure in the cavity and axially movable to transmit spring pressure to the diaphragm, g) the poppet carried for axial movement with said structure, h) and blocking means to block relative rotary movement between the pressure transmitting element and said body, said blocking means extending generally radially relative to said body and said pressure transmitting element.

19. In a fluid pressure regulator, the combination comprising:

a) a body forming a cavity and a cap on the body extending over the cavity, the cap and body carrying interengaging threads allowing rotary make-up of the cap on the body, b) a diaphragm in the cavity and seated on a ledge formed by the body, thereby to form a seal, c) a pressure transmitting element in the cavity to transmit cap pressure to said seal, d) the body having flow porting and there being a poppet in the body and movable to control fluid flow via said porting, e) a spring in the cap, f) structure in the cavity and axially movable to transmit spring pressure to the diaphragm, g) the poppet carried for axial movement with said structure, h) and blocking means to block relative rotary movement between the pressure transmitting element and said body, i) and wherein said blocking means comprises a key extending radially in said body and radially in said pressure transmitting element.

20. In a fluid pressure regulator, the combination comprising:
   a) a body forming a cavity and a cap on the body extending over the cavity, the cap and body carrying interengaging threads allowing rotary make-up of the cap on the body,
   b) a diaphragm in the cavity and seated on a ledge formed by the body, thereby to form a seal,
   c) cap pressure being transmitted to the seal,
   d) the body having flow porting and there being a poppet in the body and movable to control fluid flow via said porting,
   e) a spring in the cap,
   f) structure in the cavity and axially movable to transmit spring pressure to the diaphragm,
   g) the poppet carried for axial movement with said structure,
   h) and blocking means to block relative rotary movement between the body and said structure.

21. The combination of claim 20 wherein said blocking means comprises a key extending radially in said body and radially in said structure.

* * * * *